(12) United States Patent
Beyer et al.

(10) Patent No.: US 8,578,077 B2
(45) Date of Patent: Nov. 5, 2013

(54) GROUP MASTER COMMUNICATION SYSTEM AND METHOD FOR SERIALLY TRANSMITTING DATA IN AUTOMATION SYSTEMS

(75) Inventors: Stefan Beyer, Ebermannsdorf (DE); Matthias Meier, Poppenricht (DE)

(73) Assignee: Siemens Aktiengesellschaft, Munich (DE)

( * ) Notice: Subject to any disclaimer, the term of this patent is extended or adjusted under 35 U.S.C. 154(b) by 436 days.

(21) Appl. No.: 12/866,050

(22) PCT Filed: Feb. 6, 2008

(86) PCT No.: PCT/EP2008/000917
§ 371 (c)(1),
(2), (4) Date: Aug. 4, 2010

(87) PCT Pub. No.: WO2009/097871
PCT Pub. Date: Aug. 13, 2009

(65) Prior Publication Data
US 2010/0332705 A1    Dec. 30, 2010

(51) Int. Cl.
*G06F 13/00* (2006.01)
(52) U.S. Cl.
USPC .......................................................... 710/110
(58) Field of Classification Search
USPC .......................................................... 710/110
See application file for complete search history.

(56) References Cited

U.S. PATENT DOCUMENTS

| 5,696,911 A | 12/1997 | Fredriksson |
| 7,830,906 B2 * | 11/2010 | Satoh et al. ................... 370/423 |
| 2002/0040452 A1 | 4/2002 | Birk et al. |
| 2003/0046435 A1 * | 3/2003 | Lind et al. ..................... 709/249 |

FOREIGN PATENT DOCUMENTS

| CN | 1346196 | 4/2002 |
| DE | 19514696 A1 | 10/1995 |
| DE | 10224311 A1 | 2/2004 |
| EP | 1326172 A2 | 7/2003 |
| EP | 1746752 A2 | 1/2007 |
| EP | 1746752 A3 | 1/2008 |
| KR | 20010084992 | 9/2001 |
| WO | WO 9114324 A1 | 9/1991 |

OTHER PUBLICATIONS

Office Action for Chinese Appln. No. 200880125194.0, dated Aug. 27, 2012.

* cited by examiner

*Primary Examiner* — Glenn A Auve
(74) *Attorney, Agent, or Firm* — Harness, Dickey & Pierce, P.L.C.

(57) ABSTRACT

A communication system and method are disclosed for serially transmitting data in automation systems. In at least one embodiment, the system includes a base module as the system master, a plurality of extension modules as the slaves and a bidirectional communication connection that serially connects the base module to the extension modules. A status as group master for the serially subsequent extension module is allocated to at least two of the extension modules, the base module communicating with the extension modules depending on said allocation.

8 Claims, 2 Drawing Sheets

FIG 1 -related art-
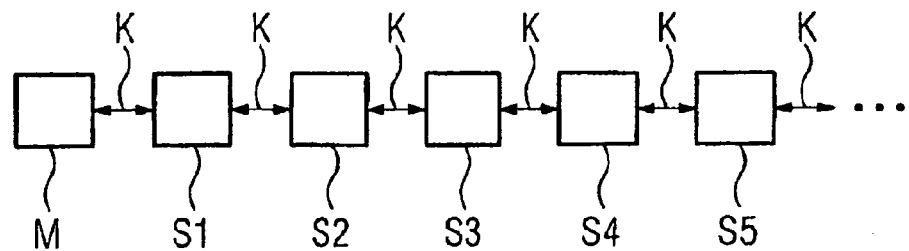
FIG 2
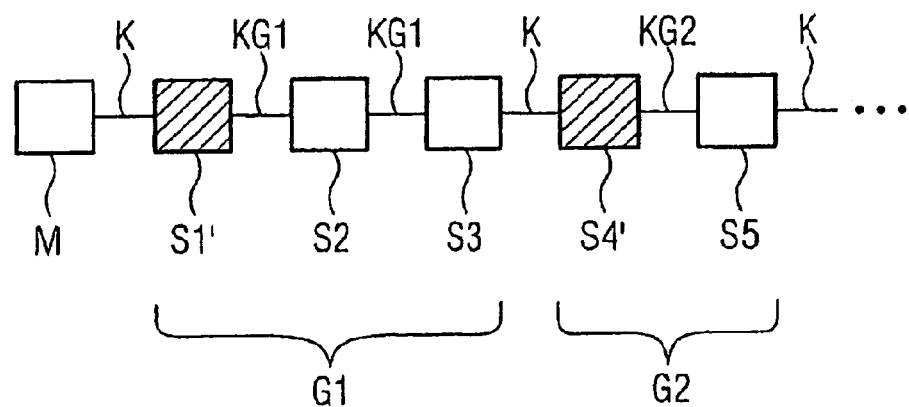

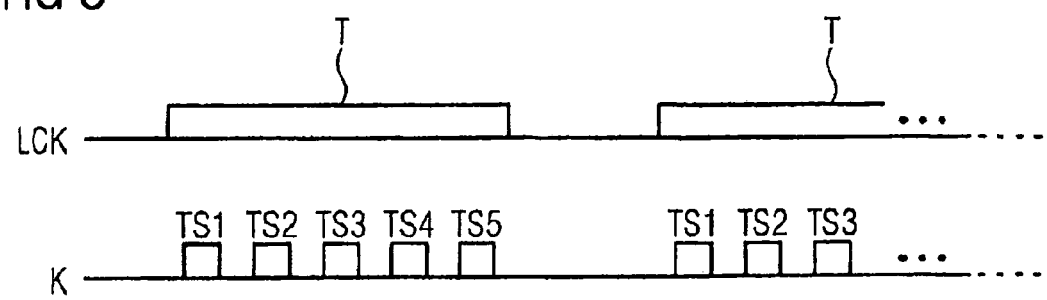
FIG 3 -related art-
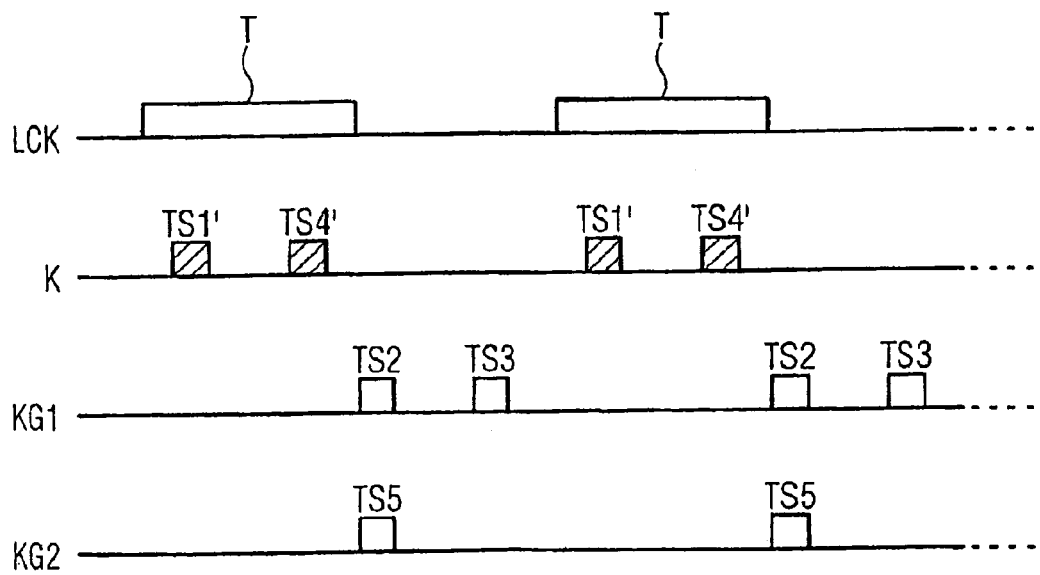
FIG 4

GROUP MASTER COMMUNICATION SYSTEM AND METHOD FOR SERIALLY TRANSMITTING DATA IN AUTOMATION SYSTEMS

PRIORITY STATEMENT

This application is the national phase under 35 U.S.C. §371 of PCT International Application No. PCT/EP2008/000917 which has an International filing date of Feb. 6, 2008, which designates the United States of America, the entire contents of which are hereby incorporated herein by reference.

FIELD

At least one embodiment of the invention generally relates to a communication system for serially transmitting data in automation technology and/or to a corresponding communication method.

BACKGROUND

The aim of automation technology is for machines or systems to operate completely autonomously and independently of people. The degree of automation is higher, the better this aim is achieved. For this purpose, all levels, from a central controller (the so-called PLC) to the motor branch circuits or motor controllers at the field level, must communicate with one another.

In this case, motor branch circuits protect and control the motor independently of the superordinate central controller. The motor remains completely protected and controllable even if the PLC fails or in the event of a fault in communication with this PLC.

Motor branch circuits known nowadays are already modular and are therefore in the form of flexible systems. In this respect, a basic unit as a basic module already performs all protective and control functions needed to operate the motor branch circuit. If necessary, this basic module can be supplemented with expansion modules having additional functions via its system interfaces. For example, the type and number of binary or analog inputs and outputs can be gradually increased. Alternatively, an additional current or voltage detection module can be used to monitor power-related measurement variables (for example for energy management), etc. However, so that these functions can also be used, the expansion modules must communicate and continuously interchange data with the basic module.

WO 91/14324 A discloses a method and a communication system for serially transmitting data. In this case, data are transmitted using one or more input and/or output modules under the control of at least one master unit. Said document describes that the input/output modules can be connected to the master unit via one or more slave units and a serial data transmission system.

DE 102 24 311 A1 has already described a method for serial communication between a basic module and a number of expansion modules, which method could thus be used in a motor branch circuit. In the case of the bidirectional communication method described here, data are shifted and interchanged between the basic module and the subsequent expansion modules, in the sense of a serial shift register, in such a manner that, in addition to easily recognizing the expansion modules, data can also be transmitted with little technical effort.

However, this method has the disadvantage that, as a result of the serial communication through all modules, communication between the basic module and the expansion modules is relatively slow since all expansion modules must heed the data sent by the basic module.

SUMMARY

At least one embodiment of the invention provides a communication system and a communication method for faster communication between a serial arrangement of basic and expansion modules, in particular modules for motor branch circuits.

According to at least one embodiment of the invention, as a result of the fact that individual expansion modules are allocated a status as group master for the expansion modules which respectively serially follow them and the basic module communicates with the individual expansion modules on the basis of this assignment, the number of expansion modules is subdivided into at least two groups which can be addressed in different ways.

The basic module will advantageously cyclically interchange data only with those expansion modules which have been assigned the status as group master in first time periods designated messages via the communication link, and the expansion modules which have not been assigned the status as group master will forward the communicated data. Such "global" communication restricted to a few expansion modules reduces the amount of time needed for the actual message phase for the basic module.

The group masters can then interchange data with the expansion modules respectively assigned to them in second time periods between the messages. To this end, the group masters will advantageously ignore the data transmitted by the serially preceding expansion module or basic module in these time periods between the messages. This results in only "local" communication in the pause times and thus in local data interchange between a few expansion modules, namely those which belong to the respective local group, and their group masters.

A distinction between global and local data interchange of at least one embodiment thus makes it possible overall to achieve faster and more efficient communication between the modules of the motor branch circuit. Communicated data are now handled differently depending on the status of an expansion module and no longer need to be heeded by all modules. The transmission paths and thus the propagation times for interchanging data can therefore be shortened considerably.

In another advantageous embodiment, the basic module will use the communication link to additionally send a control signal which informs the expansion modules of whether there are first time periods as messages or second time periods between the messages. This control signal may be a predefined cyclically recurring binary signal which is sent in the communication link either via the same line as the data or via an additional line. In addition, the control signal could be temporally adapted by the basic module in order to thus dynamically control the interchange of data at the global and local level during operation of the motor branch circuit. This dynamic allocation enables temporally varying group formation within the overall system, with the result that the data, in a form adapted to the current situation, are globally transported to the correct locations in an even faster manner and are locally processed there in the individual subgroups.

BRIEF DESCRIPTION OF THE DRAWINGS

The invention shall now be described by way of example embodiments using the following figures, in which:

FIG. 1 shows a known serial system construction,

FIG. 2 schematically shows the principle according to an embodiment of the invention, FIG. 3 shows cyclical communication in the case of known serial data interchange, and FIG. 4 shows cyclical communication according to an embodiment of the invention.

DETAILED DESCRIPTION OF THE EXAMPLE EMBODIMENTS

FIG. 1 schematically illustrates a system construction of a motor branch circuit, which is conventional nowadays, consisting of a basic module M and five expansion modules S1 to S5. In this case, the basic module M is the system master which communicates with the expansion modules connected in series. In this case, the basic module M represents the basic unit of a motor branch circuit, which basic unit contains all necessary basic functions which protect the motor controlled thereby from overload, a ground fault and excessive heating. The expansion modules S1 to S5 are connected to the basic unit M via the serial communication link K by way of a system interface (not illustrated in any more detail) of the basic unit M. The expansion modules S1 to S5 illustrated schematically here may be additional units, for example additional input/output modules, current or voltage monitoring modules or operating or display modules. Depending on the number of desired expansion functions, the communication link K is thus used to connect the system interface of the basic module to an input of the first expansion module S1 whose output is then connected to the input of the next expansion module S2, etc.

FIG. 3 shows the associated temporal profile of communication between the modules M, as system masters, and the expansion modules S1 to S5 acting as slaves. The master M interchanges data with its slaves in a cyclically recurring manner via the communication link K. For this purpose, a control signal LCK is provided as a clock signal which repeats first time periods, which are designated messages T, in a cyclically recurring manner. During these messages T, the basic module M then uses the communication link K to send and receive data in data packets to and from the individual expansion modules S1 to S5. In this case, these data packets can be constructed as described in DE 102 24 311 A1. That is to say, the modules bidirectionally interchange data in individual data packets TS1 to TS5 of typically 4 bytes. In this case, the first byte of a data packet TS1 to TS5 is a so-called module recognition byte, the second and third bytes contain the data to be communicated for the addressed module and the last byte contains a type of checksum for the previous three bytes. The master M can thus use the serial communication link K to bidirectionally interchange data in individual data packets TS1 to TS5 with each of the slaves assigned to it within a message T. However, this communication method has the disadvantage that it is relatively time-consuming since each of the slaves (here S1 to S5) must be addressed by the master M inside a message.

FIG. 2 now schematically illustrates an embodiment of the inventive structure of the modules. In this respect, the series of expansion modules is subdivided into at least two groups G1 and G2. For this purpose, the first expansion module, for example, is assigned a status as group master S1' for the two following modules S2 and S3 and the first group G1 is thus formed. The second group G2 is formed by the fourth expansion module S4' also being assigned the status as group master for S5. This assignment of individual expansion modules to the groups and the number of expansion modules in each group will essentially depend in this case on how the functions of the individual expansion modules must interact during operation of the motor branch circuit.

FIG. 4 shows the communication temporal profile required for this. A control signal LCK is again provided for this purpose. In contrast to the data transmission known from DE 102 24 311 A1, global data interchange (TS1', TS4') via the communication link K occurs here during the messages T but only between the master M and those expansion modules S1' and S4' which have been allocated the status of group master. During this message phase, the remaining expansion modules S2, S3, S5, etc. forward the data transmitted here virtually only as a shift register.

At the end of the cyclical message T, the slaves S1' and S4' become group masters which ignore their inputs, with the result that exclusively communication within the groups G1 and G2 can then occur in the time periods between the messages T. At the same time, the expansion modules S2, S3 and S5 change over from the process of purely forwarding the data such that they now communicate with the expansion modules S1' and S4'. Local communication can thus be set up without influencing actual global communication.

Since data are thus interchanged between the respective correspondingly assigned modules on a global (K) and local (KG1, KG2) basis, the communication time can be reduced overall within a motor branch circuit designed according to an embodiment of the invention. If this allocation is dynamically effected by means of a correspondingly adapted control signal, the communication time can be optimized even further.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A communication method for serially transmitting data in automation technology including a basic module as a system master, a number of expansion modules as slaves, and a bidirectional communication link via which the basic module serially communicates with the expansion modules, the number of expansion modules being subdivided into at least two groups by allocating at least two of the expansion modules a status as group master for the expansion modules which serially follow them in the respective group, the method comprising:

cyclically interchanging characterized in that data in first time periods which are designated messages, between the basic module and only expansion modules, of the number of expansion modules, assigned the status as group master, expansion modules of the number of expansion modules which have not been assigned the status as group master forwarding the communicated data; and interchanging data, between the group masters and the expansion modules in the respective group which are respectively assigned to them, in second time periods between the messages.

2. The communication method as claimed in claim 1, wherein the group masters ignore the data transmitted by a serially preceding expansion module or basic module in the second time periods between the messages.

3. The communication method as claimed in claim 2, wherein the basic module uses the communication link to additionally send a control signal which informs the expansion modules of whether there are first time periods as messages or second time periods between the messages.

4. A motor branch circuit for a motor management system in automation technology, comprising:
- a basic module with basic functions for the motor branch circuit; and
- a number of expansion modules which communicate with one another by way of the communication method as claimed in claim 2.

5. The communication method as claimed in claim 1, wherein the basic module uses the communication link to additionally send a control signal which informs the expansion modules of whether there are first time periods as messages or second time periods between the messages.

6. A motor branch circuit for a motor management system in automation technology, comprising:
- a basic module with basic functions for the motor branch circuit; and
- a number of expansion modules which communicate with one another by way of the communication method as claimed in claim 5.

7. A motor branch circuit for a motor management system in automation technology, comprising:
- a basic module with basic functions for the motor branch circuit; and
- a number of expansion modules which communicate with one another by way of the communication method as claimed in claim 1.

8. The communication method as claimed in claim 1, wherein the communication system is a motor management system including a motor branch circuit with basic functions, as the basic module, which is connected to a number of expansion modules having additional functions.

* * * * *